Feb. 19, 1963   H. T. HOFFMAN   3,077,775
SCANNING APPARATUS
Filed June 10, 1958   3 Sheets-Sheet 2

INVENTOR.
HOWARD T. HOFFMAN
BY
*John F. Luchers*
ATTORNEY

United States Patent Office 3,077,775
Patented Feb. 19, 1963

3,077,775
SCANNING APPARATUS
Howard T. Hoffman, Mentor, Ohio, assignor to Bailey Meter Company, a corporation of Delaware
Filed June 10, 1958, Ser. No. 741,186
3 Claims. (Cl. 73—341)

This invention relates to apparatus for sequentially measuring a number of variables and producing output signals representative of the magnitudes thereof which may be utilized, for example, as the inputs to analog to digital conversion equipment.

Apparatus for scanning a number of variables such as temperature or pressure are well known in the art. Rotary or stepping switches have been utilized for sequentially connecting a plurality of measuring points to a measuring circuit. For example, in a temperature scanner two levels of a stepping switch have been employed to sequentially connect a plurality of thermocouples to a D.-C. measuring circuit.

While scanning devices of the above type serve their intended functions, they have been found to be subject to several limitations which have restricted their use where precision measurements are required. One such limitation is the fact that the measuring circuit is designed for optimum sensitivity and accuracy for one particular magnitude and range of variation of the variable. Thus, if a single measuring circuit is employed in a system wherein a number of variables having widely varying magnitudes are measured, it is apparent that the measuring circuit cannot be designed for maximum sensitivity and accuracy for all of the variables.

The limitations on the use of a D.-C. potentiometer measuring circuit with a scanner arranged to sequentially connect the circuit with a plurality of thermocouples are probably most illustrative of the problem. Generally, the potentiometer circuit includes a slidewire resistance connected across a voltage source. The thermocouple voltage is applied to the movable contact arm of the slidewire resistance, and an error detector measures the unbalance voltage and positions the contact arm until the thermocouple voltage is balanced by the voltage drop across a portion of the slidewire. Under balanced conditions the position of the contact arm is indicative of the magnitude of the thermocouple temperature.

It is desired to make use of the full length of the slidewire resistance over the range of variation of the thermocouple temperature to achieve maximum accuracy and sensitivity. Thus, if the thermocouple temperature varies in a range of 800–1000° F. it is desired to calibrate the circuit so that the contact arm is positioned at one end of the slidewire at 800° F. and at the other end at 1000° F. This is usually accomplished by use of range and suppression resistors connected in series with the slidewire and source to produce a voltage drop across the slidewire in the same range and same order of magnitude as the range and magnitude of the thermocouple voltage in the 800–1000° F. temperature range. For example, if the thermocouple voltage is 20 millivolts at 800° F. and 30 millivolts at 1000° F., range and suppression resistors are provided so as to produce a 20 millivolt potential at one end of the slidewire and a 30 millivolt potential at the other end thereof. Thus, the entire length of the slidewire is employed over the range of temperature variations of the thermocouple and maximum accuracy and sensitivity is obtained.

The above described circuit is capable of producing a precision measurement of the temperature of a single thermocouple. Also, if a plurality of thermocouples were scanned each having a range of temperature variations in the order of 800–1000° F., the measuring circuit described above would also produce optimum accuracy and sensitivity for each temperature measurement. However, in the usual application of a scanner the magnitudes of the temperatures measured vary widely though their range of variations may remain fairly constant. For example, one thermocouple may vary in the range of 800–1000° F. as described above, while a second thermocouple may vary in the range of 900–1100° F. Still another thermocouple may vary in the range of 1000–1200° F.

It is obvious that the potentiometer circuit described above for use with a thermocouple having a temperature range of 800–1000° F. would be unsatisfactory for the 900–1100 and 1000–1200° F. ranges.

In the past, measurement of several different temperatures having varying magnitudes has been accomplished by selecting range and suppression resistors so as to produce a potential difference across the slidewire sufficient to encompass the entire temperature range encountered. Thus, for the three thermocouples descriped above, the potential at one end of the slidewire would correspond to 80° F. while the potential at the other end thereof would correspond to 1200° F. The obvious result of providing a potential difference across the slidewire sufficient to encompass a wide range of temperature variation is to reduce the accuracy and sensitivity of the measuring circuit since only a portion of the slidewire will be employed during each temperature measurement. Accordingly, it has been necessary to sacrifice the accuracy of the measurement to measure a plurality of variables with a single scanner and measuring circuit.

It is a principal object of this invention to achieve maximum accuracy and sensitivity in the measurement of a plurality of variables through the use of a scanner and single measuring circuit.

Another object of the invention is to vary automatically the circuit conditions of a measuring circuit during the scanning of a plurality of variables to provide optimum circuit conditions during the measurement of each individual variable.

Another object of this invention is to switch automatically different range and suppression resistors in to a measuring and transmitting circuit to achieve maximum sensitivity and accuracy in the measurement of a plurality of variables having different relative magnitudes.

Still a further object of the invention is to provide a scanning apparatus which modifies each input signal to bring it within predetermined limits for maximum measurement accuracy and sensitivity but which produces output signals directly proportional to the magnitude of the input signals prior to such modification.

Another object of the invention is to provide a scanning apparatus wherein the output signals bear a non-linear relation to the input signals.

Yet another object is to provide a scanning apparatus wherein the output signals are representative of the input signals but of a different order of magnitude as may be required for optimum operation of analog to digital conversion equipment or other output signal utilizing equipment.

Other objects and advantages will become apparent from the following description taken in connection with the accompanying drawings wherein.

Figure 1:
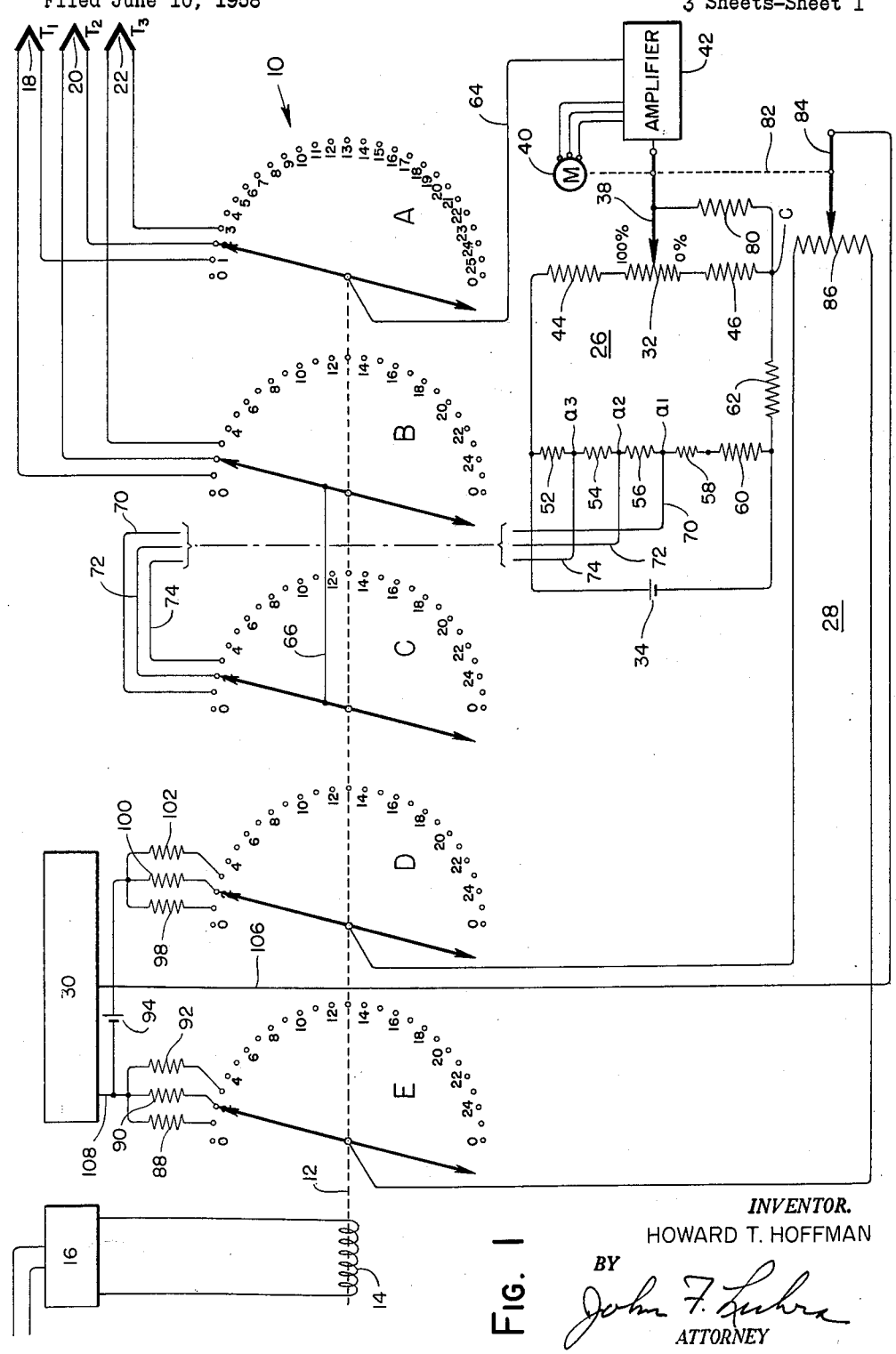
FIG. 1 is a schematic illustration of a scanning apparatus embodying this invention.

Referring more particularly to FIG. 1 of the drawings, the scanning apparatus includes a five level stepping or scanning switch indicated generally by the reference numeral 10 and having contact levels indicated by the reference letters A, B, C, D, and E. Each contact level is provided with a wiper or contact arm effective upon rotation thereof to sequentially engage a plurality (in this case 25) of fixed contacts adapted to be connected in an electric circuit. The contact arms are mechanically connected by means of a linkage 12 and arranged to be actuated by a solenoid coil 14 which is energized by a control circuit 16. The solenoid coil 14 is operative in response to a pulse received from the control circuit 16 to advance the contact arms one contact position.

The contact levels A and B are employed to sequentially connect a plurality of thermocouples 18, 20 and 22 to a measuring circuit indicated generally by the reference numeral 26. While only three thermocouples have been illustrated it will be apparent to those skilled in the art that the number of thermocouples may correspond to the number of contacts on the stepping switch 10. The level C of the stepping switch is employed to control the level of suppression in the measuring circuit as will be hereinafter described.

A retransmitting circuit indicated by the reference numeral 28 is responsive to the position of a contact arm of a slidewire resistance in the measuring circuit 26 to establish an electrical output signal adapted for transmission to a device 30, which may be, for example, analog to digital conversion equipment or other signal responsive equipment. Levels D and E of the stepping switch are employed to control the range and level of suppression in the retransmitting circuit 28.

Referring now to the specific circuit employed, the measuring circuit 26 comprises a balanceable potentiometer circuit including a slidewire resistance 32 connected across a D.-C. voltage source 34. The slidewire 32 has a movable contact arm 38 which is positioned by a reversible electric motor 40 sensitive to the electrical output of an amplifier 42. In general, the amplifier acts as an error detector comparing the voltage drop across a portion of the slidewire 32 with the voltage or E.M.F. generated by the thermocouples. If the two voltages are unequal, the amplifier 42 will effect rotation of the motor 40 and position the contact arm 38 until the voltages are balanced. Thus, the position of the contact arm 38 is proportional to the temperature of the particular thermocouple to which the measuring circuit is connected through contact levels A, B of the stepping switch.

Resistors 44, 46 are connected in series with the slidewire 32 across the voltage source to calibrate the potentiometer circuit for a desired range and suppression level. More particularly, if the slidewire 32 is connected directly across the voltage source 34, the potential drop across the slidewire will equal the source voltage. This is not desirable in some cases as the source voltage may be much higher than the maximum E.M.F. generated by the thermocouple resulting in the use of only a very small percentage of the slidewire length. In addition, the thermocouples 18, 20, 22 may sense temperatures which vary only over a small range seldom reaching a very low value, thus also resulting in the use of only a small percentage of the slidewire length.

As mentioned in the introductory portion of this paper it is desired to make use of the full length of the slidewire resistance over the range of variation of the thermocouple temperature to achieve maximum accuracy and sensitivity. Thus, if the temperature and voltage of a thermocouple connected to the measuring circuit varies in the range of 800–1000° F. and 20–30 millivolts respectively, it is desired to calibrate the circuit so that the contact arm 38 is positioned at one end of the slidewire at 800° F. (20 mv.) and at the other end at 1000° F. (30 mv.). This can be accomplished by selecting the resistors 44, 46 of sufficient value to produce a 20 mv. potential at one end of the slidewire and 30 mv. at the other end thereof. Thus, by properly selecting the values of the resistors 45, 46, the circuit can be calibrated to make use of the full length of the slidewire 32 for a particular thermocouple.

The calibration provided by resistors 44, 46 is sufficient only in a system having one temperature range. When a number of temperatures are scanned, however, having varying levels of magnitude, the exact calibration provided for a single range by means of resistors 44, 46 is not sufficient. For example, if the measuring circuit were calibrated for the temperature range of 800–1000° F. described above and thermocouple 18 varied over this range, the measuring circuit would provide an accurate indication of the temperature when the wiper arms of the levels A and B are positioned at contact No. 1. However, if the thermocouple 20 normally varied in temperature from 900 to 1100° F., the measuring circuit would not provide an accurate indication of the temperature when the control circuit 16 steps the wiper arms to contact No. 2. In this case the contact arm 38 would fail to indicate any temperatures above 1000° F.

As mentioned in the introductory remarks, it is possible to provide the resistors 44, 46 with sufficient resistance values to establish a potential across the slidewire 32 sufficient to encompass the entire temperature range encountered. For example, if thermocouple 18 varies from 800–1000° F. (20–30 mv.) as previously described, thermocouple 20 varies from 900–1100° F. (25–35 mv.) and thermocouple 22 from 1000–1200° F. (30–40 mv.), the resistors 44 and 46 could be selected to establish a potential of 40 mv. at one end of the slidewire and a potential of 20 mv. at the other end so that the contact arm 38 would indicate 1200° at one end of the slidewire and 800° at the other end to encompass the entire range of temperatures encountered. This type of calibration is obviously not desirable, however, in that only a portion of the slidewire is employed to measure each temperature resulting in decreased sensitivity and accuracy.

Normally the variables of a system vary in relative magnitude but have about equal ranges of variation. Therefore, substantially the full length of the slidewire resistance can be utilized during the measurement of each variable scanned, if the suppression in the measuring circuit is automatically varied to accommodate variables having different relative magnitudes.

Level C of the stepping switch is utilized to switch varying degrees of suppression into the measuring circuit 26 to thereby calibrate the same according to the temperature of each thermocouple. More particularly, a plurality of resistors 52, 54, 56, 58, 60 are connected in series across the voltage source 34 in parallel circuit with the resistors 32, 44, 46. In addition, a resistor 62 is connected in series with the resistors 32, 44, 46 to complete the circuit. The resistors 52 to 58 inclusive are effective to establish various levels of suppression while the resistors 60, 62 as will later be described are effective to compensate for variations in the cold-junction temperature of the thermocouples caused by ambient conditions.

One side of each thermocouple is connected to a contact on the A level of the stepping switch, the wiper arm being connected by a conductor 64 to the amplifier 42. The other side of each thermocouple is connected to a corresponding contact on level B, the wiper arm being electrically connected to the wiper arm of level C by a conductor 66. The first three contacts of level C are illustrated as connected by conductors 70, 72, 74 to junctions $a_1$, $a_2$, $a_3$.

In the circuitry described above, the wiper arm of level A is effective to connect one side of each thermocouple to the amplifier 42 while the wiper arms of levels C and B are effective to connect the other side of each thermocouple to one of the junctions $a_1$, $a_2$, $a_3$, the particular junction to which the thermocouple is connected determining the suppression level as will now be described.

For purposes of illustration, assume that the resistors 44, 46 have resistance values to establish a potential of 50 mv. at the lower end of the slidewire 32 and a potential of 60 mv. at the upper end thereof relative to point C thus producing a potential difference of 10 mv. across the slidewire. Also, assume for purposes of illustration that the thermocouples have the following temperature and millivolt output ranges:

Thermocouple 18, 40–50 mv. _____ 1200–1400°
Thermocouple 20, 35–45 mv. _____ 1100–1300°
Thermocouple 22, 30–40 mv. _____ 1000–1200°

When the above conditions exist, the values of resistors 52–58 are selected to establish the following potentials at junctions $a_1$, $a_2$, $a_3$ relative to point C.

| | Mv. |
|---|---|
| Junction $a_1$ | 10 |
| Junction $a_2$ | 15 |
| Junction $a_3$ | 20 |

If the wiper arms of levels A and B are positioned at contact point 1, the thermocouple 18 is connected to the junction $a_1$ and amplifier 42. It is apparent that if Kirchoff's Law is applied to the circuit the potential produced at the contact arm 38 is equal to the sum of the E.M.F. generated by the thermocouple 18 and the potential at junction $a_1$ when the E.M.F. across the amplifier 42 is zero.

As noted previously, the potential at the lower end of the slidewire was calibrated to 50 mv. while the potential at the upper end of the slidewire was calibrated to 60 mv. The thermocouple 18 generates an E.M.F. in the range of 40–50 mv. to which is added the 10 mv. potential at junction $a_1$ to produce a potential in the range of 50–60 mv. at the contact arm 38. Thus, the potential produced at junction $a_1$ provides the necessary suppression to establish a signal voltage corresponding in magnitude and range to the potential difference across the slidewire 32. Thus, the measuring circuit is calibrated for maximum sensitivity and accuracy in that the entire length of the slidewire can be used in measuring the temperature of thermocouple 18.

If the control circuit 16 should energize the relay coil 14 and step the wiper arms to the number 2 contact position, the thermocouple 20 will be connected across the contact arm 38 and junction $a_2$. In this case, the thermocouple 20 produces an E.M.F. in the range of 35–45 millivolts, but the potential at point $a_2$ is 15 mv. resulting in a potential at contact arm 38 in the range of 50–60 mv. Thus, the signal potential applied to the contact arm 38 is suppressed to the potential difference across the slidewire 32 calibrating the measuring circuit for maximum sensitivity and accuracy in the measurement of the temperature at thermocouple 20.

It will be apparent that the measuring circuit is similarly calibrated when the wiper arm is positioned at contact 3 to enable the full length of the slidewire 32 to be used during measurement of the temperature of thermocouple 22. It is also apparent that additional thermocouples may be connected to contacts 4–25 of levels A and B of the stepping switch and that additional resistances may be connected in the measuring circuit by level C to provide junctions of any desired magnitude and polarity to suppress the thermocouple potential to the potential difference across the slidewire 32. With this arrangement, a very large number of thermocouples can be scanned in any desired order in that it is only necessary to connect the corresponding contact on the C level of the stepping switch to the junction point which provides the proper suppression. Accordingly, a large number of thermocouples may be scanned in any desired order by merely connecting the contacts on the C level to the appropriate junction points. Thus, the system in addition to providing an accurate measurement of a large number of variables possesses a large degree of flexibility.

The advantage of the above method of varying the suppression level in the measuring circuit is the fact that the resistors 52–60 are always connected in the measuring circuit and therefore the current remains constant. The suppression is obtained by adding or subtracting voltage drops without disturbing the circuit elements and as a result maximum sensitivity and accuracy are obtained during each temperature measurement in the scanning operation.

Referring now to the resistors 60 and 62, resistor 60 is formed from material the resistance of which varies with temperature to establish a varying voltage drop across said resistor sufficient to compensate for variations in thermocouple E.M.F. caused by the effects of ambient temperature on the cold junctions. As the temperature increases the thermocouple E.M.F. will decrease due to the heating of the cold junction. However, the resistance of resistor 60 increases resulting in an increased voltage drop across the same and an increase in potential at junctions $a_1$, $a_2$, $a_3$ to compensate for the change in thermocouple E.M.F.

Resistor 62 is connected in series with resistors 32, 44, 46 and has a constant resistance value equal to that of the resistor 60 at a predetermined reference temperature to establish a voltage drop which compensates for the circuit resistance of resistor 60 at normal ambient conditions. Thus, at normal ambient conditions the resistor 62 establishes a voltage drop equal to the voltage drop across resistor 60 and thereby compensates for the normal resistance thereof.

Figure 4:
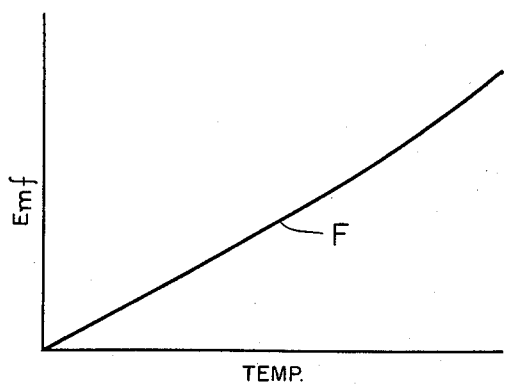
FIG. 4 is a graph illustrating the relationship of thermocouple E.M.F. and temperature.

It is well known in the art that the E.M.F. generated by a thermocouple has a non-linear relationship with the temperature of the thermocouple. In a potentiometer circuit of the type disclosed, the position of the contact arm 38 will therefore have a non-linear relationship with the E.M.F. generated by the thermocouple and hence to the actual temperature. FIG. 4 illustrates this effect, curve F showing the typical non-linear relationship between temperature and E.M.F. of a thermocouple.

To obtain maximum flexibility of the measuring circuit, it is desirable to convert the non-linear relationship to a linear relationship to thereby cause the position of the contact arm 38 to be directly proportional to temperature. The non-linear relationship can be compensated for by the provision of a resistor 80 connected between the junction C and contact arm 38 in parallel with the resistor 46 and lower portion of the slidewire 32. The resistor 80 effectively decreases the voltage drop across the resistor 46 and lower portion of the slidewire 32 to thereby cause the contact arm 38 to move upward farther to produce the balancing potential previously discussed. By properly selecting the value of resistor 80 the position of the contact arm 38 can be adjusted to substantially compensate for the non-linear relationship between temperature and E.M.F. It is also possible depending upon the value of the resistor 80 to achieve this compensation by connecting the resistor 80 directly to the end of the slidewire 32 or some other point in the circuit. Thus the compensation is established by providing a resistance connected in shunt with a portion of the slidewire resistance and is not dependent on the particular connection to juction C as shown.

Referring now to the retransmitting circuit 28, the contact arm 38 is connected by linkage 82 to a contact arm 84 of a slidewire resistance 86 which is connected across the wiper arms of the E and D levels of the stepping switch. The contacts of the E level are connected through a plurality of resistors 88, 90, 92 respectively to one side of a voltage source 94, these resistors having a function similar to the resistor 46 in the measuring circuit.

The contacts of the D level are connected through a plurality of resistors 98, 100, 102, to the other side of the source 96, these resistors corresponding in function to the resistor 44 of the measuring circuit. The output signal of the retransmitting circuit is transmitted by conductors 106, 108 to the indicating and/or control circuit 30.

The retransmitting circuit 28 is a potentiometer circuit similar in function to the measuring circuit 26. A potential difference is established across the slidewire 86 by the voltage source 94, and the range and suppression resistors connected in the circuit by the D and E levels of the stepping switch calibrate the circuit to establish the desired range and suppression of the potential difference for each temperature measured by the measuring circuit. Thus, a potential difference across the slidewire 86 is established which corresponds to the range and magnitude of each variable measured. The contact arm 84 is actuated simultaneously with the contact arm 38 and thus the output potential across conduits 106, 108 corresponds to the actual temperature measured.

Figure 2:
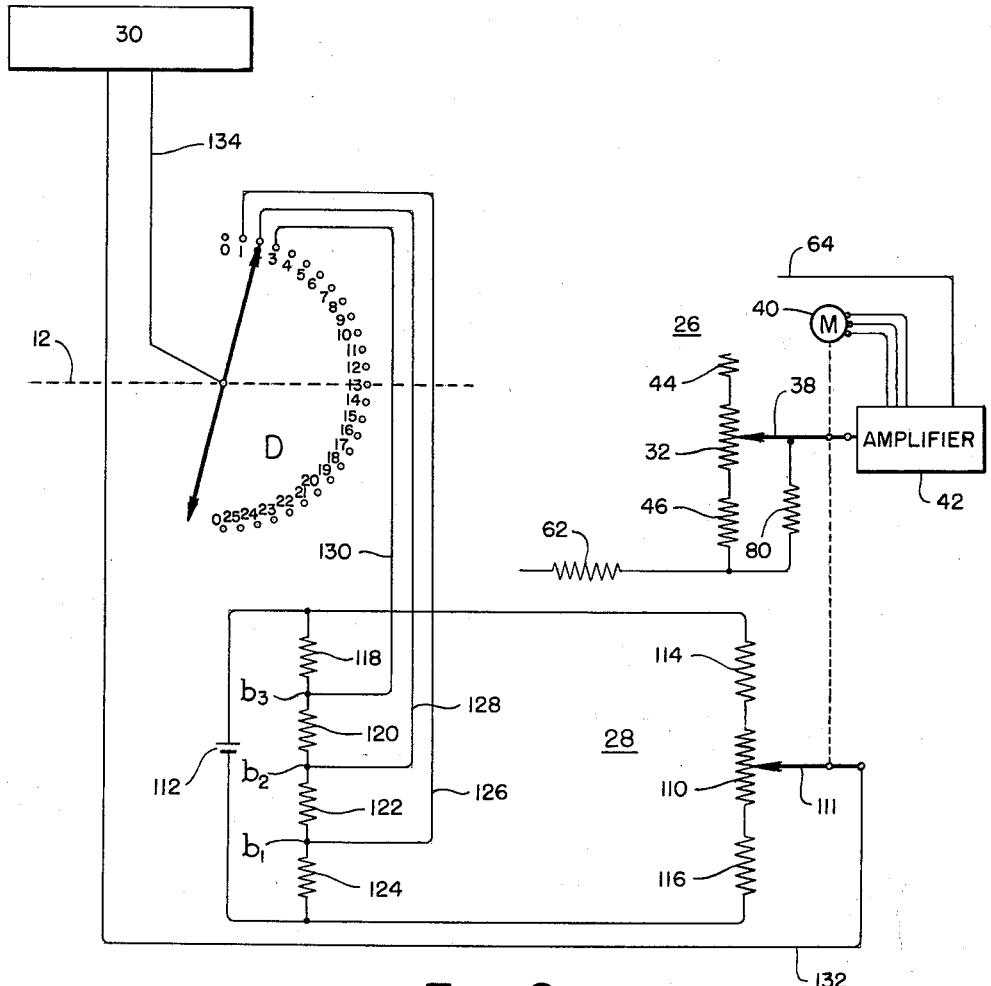
FIG. 2 is a schematic illustration of another embodiment of the invention.

Referring now to FIG. 2 of the drawings, another embodiment of the invention is illustrated wherein the method of obtaining suppression in the measuring circuit 26 is employed in the retransmitting circuit 28. More particularly, a slidewire resistance 110 having a movable contact arm 111 is connected across a voltage source 112 in series with a pair of resistors 114, 116 which correspond in function to the resistors 44, 46 respectively of the measuring circuit 26. A plurality of resistors 118, 120, 122 and 124 are connected in series across the source in parallel with the resistors 110, 114 and 116 to provide junctions $b_1$, $b_2$ and $b_3$ of varying potential similar to the junctions $a_1$, $a_2$ and $a_3$ of the measuring circuit 26. The junctions $b_1$, $b_2$ and $b_3$ are connected by conductors 126, 128 and 130 respectively to the first three contacts of the D level of the stepping switch. The contact arm 111 and wiper arm of the D level are connected by conductors 132, 134 respectively to the indicating and/or control device 30.

In operation the potential established at junctions $b_1$, $b_2$ and $b_3$ correspond in magnitude and polarity to the potentials established at junctions $a_1$, $a_2$ and $a_3$ respectively of the measuring circuit. By means of the level D of the stepping switch, the indicating and/or control device 30 is connected across the contact arm 111 and one of the junctions $b_1$, $b_2$ or $b_3$ depending on the position of the wiper arms. Thus, the output potential will be equal to the potential at contact arm 111 minus the potential of the particular (b) junction connected in the output circuit. The circuit is arranged so that the stepping switch serves to connect the (b) junction in the output circuit corresponding in potential to the (a) junction connected in the measuring circuit.

The retransmitting circuit 28 in FIG. 2 is calibrated by means of resistors 114 and 116 to produce a potential difference across slidewire resistance 110 which will be interpreted by device 30 to have a temperature range and magnitude corresponding to the mv. range and magnitude across slidewire 32. For example if the potential difference across slidewire 32 is 50–60 mv. as previously described, then the retransmitting circuit 28 is calibrated to produce a potential difference across slidewire 110 which is interpreted by device 30 as in the range of 1400–1600° which corresponds to a mv. range of 50–60 mv. The effect of the potentials produced at junctions $a_1$, $a_2$ and $a_3$ was to suppress the thermocouple E.M.F. to range of mv. potential across slidewire 32. Therefore it is necessary to suppress or modify the retransmitting signal such that device 30 will interpret it as a temperature coresponding to the actual thermocouple E.M.F.

The net effect of the potentials established at junctions $b_1$, $b_2$ and $b_3$ is to decrease the potential of the output signal by an amount corresponding to the suppression of the thermocouple E.M.F. in the measuring circuit 26. For example, when the wiper arms of the stepping switch are at contact No. 2 the thermocouple E.M.F. (35–45 mv.) is suppressed to 50–60 mv. by the potential at junction $a_2$ in the measuring circuit. In the retransmitting circuit 28, a potential is produced at contact arm 111 corresponding to the potential of the contact arm 38. Thus, the potential at the contact arm 111 will vary in magnitude from 1400–1600° depending on the position thereof. When the wiper arms of the stepping switch are at contact No. 2, however, the output signal from the retransmitting circuit is taken across junctions $b_2$ and the contact arm 111. Thus, a 15 mv. potential is subtracted from the potential at contact arm 111 during the measurement of each thermocouple to produce an output signal having a range and order of magnitude corresponding to the temperature range and magnitude of the thermocouple E.M.F.

The retransmitting circuit illustrated in FIG. 2 is more desirable than that illustrated in FIG. 1 for the obvious reason that only a four level stepping switch is required. However, in many cases depending on the particular structure of the indicating and/or control device 30, the circuit as illustrated in FIG. 1 may be required.

Figure 3:
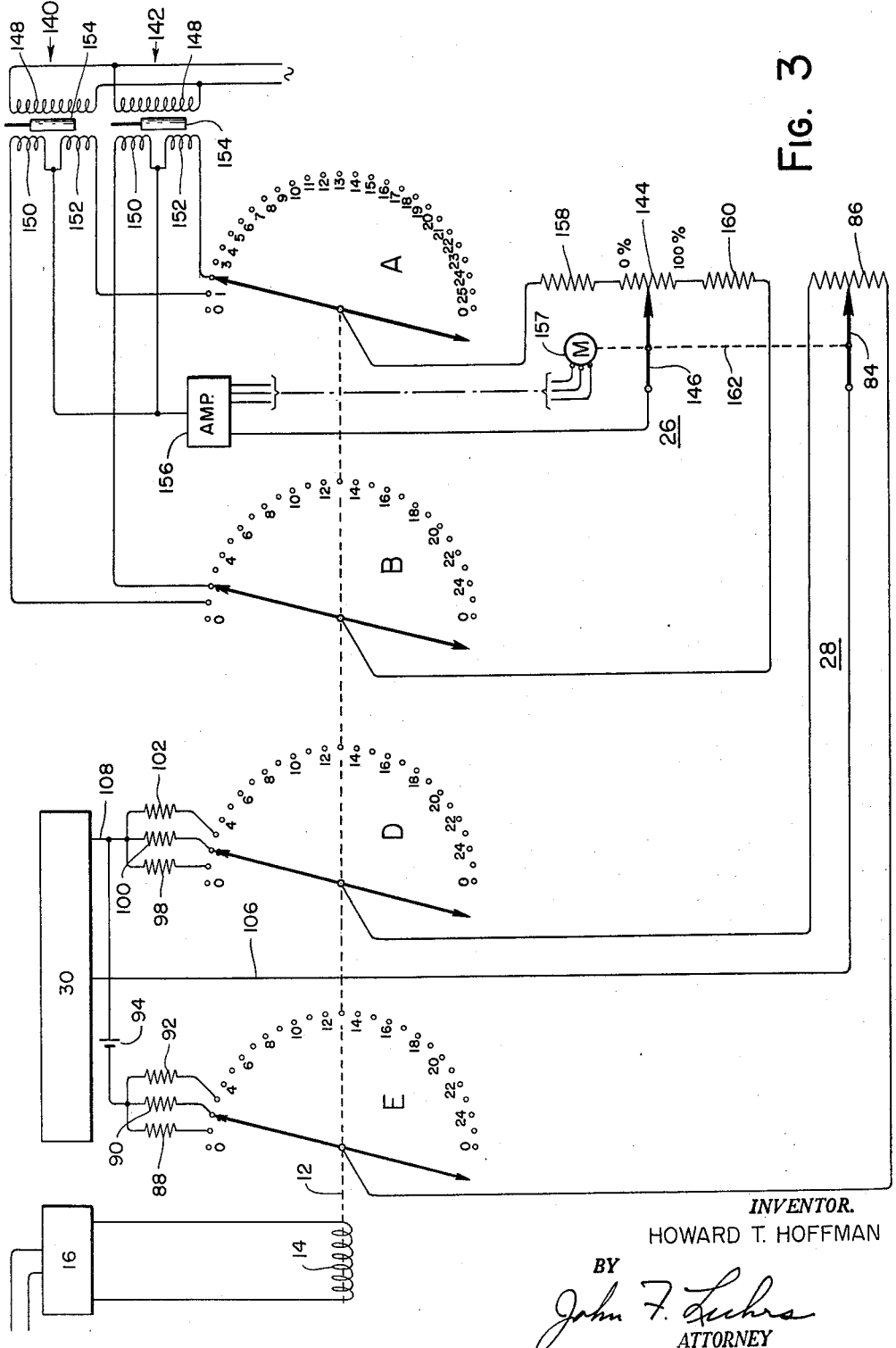
FIG. 3 is a schematic illustration of still another embodiment.

Another embodiment of the scanning apparatus is illustrated in FIG. 3 for scanning and measuring a plurality of variables wherein similar parts are given like reference numerals. In this case the level C of the stepping switch 10 is omitted, and the measuring circuit 26 takes the form of an A.-C. bridge circuit. This circuit is particularly adapted for measuring a plurality of pressures, however, as will be apparent to those skilled in the art the circuit may be employed in any application wherein a mechanical movement is produced representative of a variable.

The levels A and B of the stepping switch serve to sequentially connect a plurality of transmitting devices 140, 142 in a bridge circuit with a slidewire resistance 144 provided with a movable contact arm 146. Each transmitting device comprises a transformer having a primary winding 148 connected to an A.-C. source and adapted to be variably coupled to a pair of secondary windings 150, 152 by a movable core member 154 positioned in accordance with the magnitude of a variable. The slidewire 144 is connected to the wiper arms of the A and B levels of the stepping switch. The opposite ends of the secondary winding of each transmitter are connected to corresponding contacts respectively on each level to thereby form a bridge circuit with the slidewire 144. The junction of each pair of secondary windings is connected to an amplifier 156 which is sensitive to the bridge unbalance appearing between the junction and the contact arm 146. The amplifier 156 is effective to energize an electric motor 157 which positions the contact arm 146 to restore bridge balance.

It will be apparent that the bridge circuit will be balanced when the movable core 154 is positioned symmetrical about the center tap of the associated secondary windings 150, 152 and the contact arm 146 is positioned at the center of the slidewire resistance 144. Movement of the core 154 from this position will effect unbalance of said bridge circuit, and the amplifier 156 will respond to energize the motor and position the contact arm 146 in a direction to restore bridge balance.

A pair of resistors 158, 160 are connected in the bridge circuit to establish a predetermined voltage across the slidewire resistor 144 to thus calibrate the circuit in the same manner as resistors 44 and 46 of FIG. 1. In this case, however, it is not necessary to vary the suppression for each measurement inasmuch as the stroke of the movable cores of the measuring devices may be individually adjusted to establish a predetermined range.

The retransmitting circuit 28 of this embodiment is identical to that illustrated in FIG. 1. In this case, the contact arm 84 is mechanically connected to the contact arm 146 in the bridge circuit by a linkage 162. The range and suppression resistors in the retransmitting circuit are effective to produce an output signal for each measurement corresponding to the actual range and level of magnitude of the variable.

While several embodiments of the invention have been herein shown and described, it will be apparent to those skilled in the art that many changes may be made in the construction and arrangement of parts without departing from the scope of the invention as defined in the appended claims.

What I claim as new and desire to secure by Letters Patent of the United States is:

1. In a measuring circuit, the combination comprising, a voltage source, a slidewire resistance connected across the voltage source, a movable contact arm cooperable with said slidewire resistance for producing a first potential on said contact arm corresponding to its position relative to said slidewire, means for establishing a second potential having a non-linear relationship with the magnitude of a variable, means operatively connected to said contact arm responsive to the difference between said first and second potentials for positioning said contact arm to balance said potentials and indicate the magnitude of the variable, and a single fixed compensating resistor connected between said contact arm and one end of said slidewire resistance to vary the voltage drop across said slidewire resistance to produce a smooth linear relationship between the magnitude of the variable and the position of said contact arm.

2. A measuring circuit as claimed in claim 1 wherein a pair of calibrating resistors are connected in series with said slidewire resistance on opposite sides thereof to establish a predetermined potential at each end of said slidewire resistance, and said compensating resistor is connected between said contact arm and one end of one of said calibrating resistors.

3. In a scanning and retransmitting circuit, the combination comprising, a first D.-C. voltage source, a plurality of thermocouples for sensing a plurality of temperatures which have similar ranges but different relative magnitudes, each of said thermocouples being operative to generate an E.M.F. having a magnitude and range proportional to the range and magnitude of the temperature, a potentiometer circuit for measuring the thermocouple E.M.F.'s comprising a slidewire resistance connected across said first voltage source, a contact arm cooperative with said slidewire resistance and having a first potential corresponding to its position, a pair of calibrating resistors connected in series with said slidewire resistance to establish a predetermined potential at each end thereof and a potential drop across the same corresponding to the range of variation of the thermocouple E.M.F.'s, a first plurality of resistors connected in a parallel circuit with said slidewire resistance and calibrating resistors and defining a first plurality of junction points having different voltage potentials, a scanning switch electrically associated with said thermocouples and said contact arm for selectively connecting each of said thermocouples between one of said junction points and said contact arm to thereby establish a second potential corresponding to the algebraic sum of the thermocouple E.M.F. and the potential at the junction point, an electric motor operatively connected to said contact arm for positioning said contact arm relative said slidewire resistance, an amplifier having an output connected to said motor and sensitive to the unbalance between said first and second potentials to effect rotation of said motor to position said contact arm to balance said potentials, a second D.-C. voltage source, a second slidewire resistance connected across said second voltage source, a second contact arm cooperative with said second slidewire resistance and having a potential corresponding to its position, said second contact arm being mechanically coupled to the first said contact arm, a pair of calibrating resistors connected in series with said second slidewire resistance for establishing potentials at the ends thereof corresponding to the potentials at the ends of the first said slidewire resistance, a second plurality of resistors connected in parallel circuit with said second slidewire resistance and providing a second plurality of junction points having different voltage potentials, means for manifesting the temperatures sensed by said thermocouples, and a second scanning switch electrically associated with said second junction points and said manifesting means for selectively connecting said manifesting means between said second contact arm and one of said second junction points, the signal supplied to said manifesting means being equal to the algebraic sum of the potential of said second contact arm and the potential at the junction point.

References Cited in the file of this patent

UNITED STATES PATENTS

| | | |
|---|---|---|
| 2,003,681 | Doyle | June 4, 1935 |
| 2,050,629 | Quereau et al. | Aug. 11, 1936 |
| 2,364,923 | Smith | Dec. 12, 1944 |
| 2,420,574 | Tegge | May 13, 1947 |
| 2,476,025 | Clark | July 12, 1949 |
| 2,509,046 | Smith | May 23, 1950 |
| 2,509,048 | Vogelsang | May 23, 1950 |
| 2,665,355 | Van Alen et al. | Jan. 5, 1954 |
| 2,675,510 | Belcher et al. | Apr. 13, 1954 |
| 2,696,119 | Jones | Dec. 7, 1954 |
| 2,711,463 | Goeppinger et al. | June 21, 1955 |
| 2,745,285 | Wannamaker | May 15, 1956 |
| 2,793,813 | Belcher | May 28, 1957 |